(12) United States Patent
Iwase

(10) Patent No.: US 7,819,000 B2
(45) Date of Patent: Oct. 26, 2010

(54) TIRE WEAR TEST METHOD

(75) Inventor: Masanori Iwase, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 77 days.

(21) Appl. No.: 12/091,070

(22) PCT Filed: Nov. 8, 2006

(86) PCT No.: PCT/JP2006/322268

§ 371 (c)(1),
(2), (4) Date: Apr. 22, 2008

(87) PCT Pub. No.: WO2007/060836

PCT Pub. Date: May 31, 2007

(65) Prior Publication Data

US 2009/0120178 A1    May 14, 2009

(30) Foreign Application Priority Data

Nov. 22, 2005    (JP) .............................. 2005-337105

(51) Int. Cl.
*G01M 17/02* (2006.01)
(52) U.S. Cl. ....................................................... 73/146
(58) Field of Classification Search ........................ None
See application file for complete search history.

(56) References Cited

U.S. PATENT DOCUMENTS

| | | | | |
|---|---|---|---|---|
| 4,344,324 | A * | 8/1982 | Langer | 73/146 |
| 4,584,873 | A * | 4/1986 | Ongaro | 73/146 |
| 4,848,143 | A | 7/1989 | Ushikoshi | |
| 6,382,020 | B1 * | 5/2002 | Fischer et al. | 73/146 |
| 6,430,993 | B1 * | 8/2002 | Seta | 73/146 |
| 6,457,352 | B1 * | 10/2002 | Knestel | 73/117.03 |
| 6,615,124 | B1 * | 9/2003 | Adachi | 701/70 |

(Continued)

FOREIGN PATENT DOCUMENTS

JP    04-046197    10/1992

(Continued)

OTHER PUBLICATIONS

Stalnaker and Turner, "Vehicle and Course Characterization Process for Indoor Tire Wear Simulation", Tire and Science Technology, 30(2):100-121 (2002).

(Continued)

*Primary Examiner*—Lisa M Caputo
*Assistant Examiner*—Jermaine Jenkins
(74) *Attorney, Agent, or Firm*—Fish & Richardson P.C.

(57) ABSTRACT

A method of tire wear test capable of testing tire wear precisely by appropriately setting running modes in a simple manner.

Frequency distribution of acceleration in each of lateral direction and longitudinal direction is previously obtained during running on a test course. Also, external conditions generated on a tire mounted on a particular wheel of a test vehicle under particular running conditions are previously obtained. The external conditions are obtained being associated with the acceleration in each of lateral direction and longitudinal direction. Running modes are set up so that the external conditions are input to the tire in accordance with the frequency of acceleration corresponding to the external conditions. The tire is rolled on the simulation road surface based on the running modes to test the tire wear.

3 Claims, 6 Drawing Sheets

U.S. PATENT DOCUMENTS

| | | | |
|---|---|---|---|
| 6,754,615 B1 * | 6/2004 | Germann et al. | 703/8 |
| 6,761,060 B2 * | 7/2004 | Mancosu et al. | 73/146 |
| 7,066,018 B2 * | 6/2006 | Miyamoto et al. | 73/146 |
| 7,278,316 B2 * | 10/2007 | Satou et al. | 73/669 |
| 7,363,805 B2 * | 4/2008 | Jayakumar et al. | 73/146 |
| 7,624,629 B2 * | 12/2009 | Hanada | 73/146 |
| 2002/0124638 A1 | 9/2002 | Turner et al. | |
| 2002/0134148 A1 | 9/2002 | Turner et al. | |
| 2005/0066719 A1 | 3/2005 | Turner et al. | |

FOREIGN PATENT DOCUMENTS

| | | |
|---|---|---|
| JP | 11-173952 | 7/1999 |
| JP | 2001-001723 | 1/2001 |
| JP | 2003-050190 | 2/2003 |
| JP | 2004-522953 | 7/2004 |
| JP | 2005-114605 | 4/2005 |
| WO | WO 02/058947 | 8/2002 |

OTHER PUBLICATIONS

Information Offer Form submitted Dec. 18, 2008, in JP counterpart appln, for Item 17, above.

Written Opinion of the ISA (PCT/ISA/237) mailed Jun. 5, 2008.

Parekh et al., "Laboratory Tire Wear Simulation Process Using ADAMS Vehicle Model," Society of Automotive Engineers Paper No. 9 61001 (1996).

* cited by examiner (a)

(b)

(a)

(b)

TIRE WEAR TEST METHOD

TECHNICAL FIELD

The present invention relates to a tire wear test method for carrying out wear test on a tire by rolling the tire on a simulation road surface.

BACKGROUND ART

Generally, tire wear test is carried out outdoors by running an actual vehicle mounted with the test tire on a test course or public road. Such wear test in a manner of running test using an actual vehicle not only costs considerably but also involves a problem that, because road conditions change due to the influence of weather, a plurality of test tires are hardly evaluated under the identical conditions.

Therefore, conventionally, there is known a method of tire wear test carried out indoors by simulating running test with an actual vehicle. In such a wear test method, using a testing machine disclosed in, for example, Patent Documents 1 and 2, running modes at running test with the actual vehicle are reproduced indoors by giving conditions of vertical force, camber angle or the like to a test tire rolling on a simulation road surface. However, to carry out the tire wear test precisely, in addition that the running modes have to be reproduced precisely, there arises a problem that handling of various data necessary for the test becomes complicated.

Patent Document 3 below discloses the following method. That is, data of acceleration and speed measured by a running test with an actual vehicle on a test course, and data of three forces on tire axle and camber angle measured during a running test with the actual test vehicle, are converted into load data being associated with each other using a predetermined equation; and running modes are set up based on the load data. However, in such a test method, a test vehicle to be evaluated has to be prepared. The test may be difficult to carry out and/or may cost considerably. Therefore, the test method is not practical.

Non Patent Document 1 below describes a method in which a test course is simulated in a manner of PID (Proportional Integral Derivative) control of a vehicle model, and based on the calculated time-series data with respect to vertical forces and camber angles, running modes are set up. However, in the above test method, running modes during the running test with an actual vehicle are reproduced in time series. Transition of three forces on tire axle and camber angle changing in accordance with the running conditions has to be calculated. And further, running modes have to be set up so that the three forces on tire axle and camber angle are repeated in accordance with the circulation on the test course. As a result, amount of calculation becomes enormously large and the handling of data becomes complicated. Therefore, there arises a problem that a large human power and time are required for setting running modes. In this test method, the severity (running severity level) increased in order to carry out acceleration test (acceleration ratio: four times) to reduce the running time. However, the test results are poor in reproducibility (consistency with test results obtained during running test with an actual vehicle) of the amount of Toe&Heel wear or the like. Therefore, evaluation accuracy is not satisfactorily ensured.

Patent Document 1: Japanese Unexamined Patent Application Publication No. 11-173952

Patent Document 2: Japanese Unexamined Patent Application Publication No. 2005-114605

Patent Document 3: Japanese Unexamined Patent Application Publication No. 2004-522953

Non-Patent Document 1: Deepak Parekh and other three persons, Laboratory Tire Wear Simulation Process Using ADAMS Vehicle Model; Society of Automotive Engineers Paper, No. 961001, (USA), 1996

DISCLOSURE OF THE INVENTION

Problems to be Solved by the Invention

In view of the above-described circumstances, an object of the present invention is to provide a method of tire wear test capable of precisely testing tire wear by appropriately setting running modes in a simple manner.

Means for Solving the Problems

The object can be achieved by the following present invention. That is, the present invention provides a method of tire wear test for testing tire wear by rolling a tire on a simulation road surface, comprising the steps of: obtaining frequency distribution of acceleration in each of the lateral direction and longitudinal direction during running on a test course; obtaining each of external conditions generated under particular running conditions while associating with the acceleration in lateral direction or longitudinal direction with respect to a tire mounted on a particular wheel of a test vehicle; and rolling the tire on the simulation road surface based on running modes by setting the running modes so that the external conditions are input to the tire in accordance with the frequency of the acceleration corresponding to the external conditions.

In the tire wear test method according to the present invention, first frequency distribution of acceleration during running on a test course, in addition, external conditions with respect to a tire mounted on a particular wheel of the test vehicle while associating with the acceleration are obtained. Then, running modes are set up so that the external conditions are input to the tire in accordance with the frequency of acceleration corresponding to the external conditions. Thus, the severity is reproduced precisely on the simulation road surface, and the tire wear test that simulates the running test with the actual vehicle can be appropriately carried out.

Moreover, in the present invention, since the external conditions are input in accordance with the frequency of acceleration, unlike the conventional art, running modes may not be reproduced in time-series. Thus, the handling of data is simplified. That is, in the case where running modes are reproduced in time-series, the external conditions have to be handled as such running conditions that acceleration in lateral direction and acceleration in longitudinal direction act simultaneously. However, in the present invention, external conditions corresponding to the acceleration in each of lateral direction and longitudinal direction are obtained respectively, and it is not necessary to calculate the transition of the external conditions. As a result, the handling of data is extremely simplified and the running modes can be set up simply.

In the above method, it is preferable that the external conditions include three forces on tire axle and camber angle. Three forces on tire axle (lateral force, longitudinal force and vertical force) and camber angle are all critical factors for any of the tire wear such as T&H (toe and heel) wear, center wear and shoulder wear. The tire wear test can be carried our precisely by inputting these external conditions to the tire.

In the above method, it is preferable that the running modes are set up so that each of the external conditions corresponding to the acceleration in lateral direction or longitudinal direction is input to the tire.

In the case where running modes are reproduced in time-series as the above described conventional art, external conditions corresponding to the acceleration in each of lateral direction and longitudinal direction have to be input to the tire in a complex manner. In such test method, the handling of data is complicated and the control of a testing machine is apt to be difficult. Contrarily, the method of the present invention, component due to lateral force and component due to longitudinal force are input to the tire separately based on a concept that these two components are accumulated linearly. With this arrangement, the handling of data is further simplified and running modes can be set up further simply. Moreover, the evaluation accuracy of tire wear is satisfactorily ensured as described later.

In the above method, it is preferable that the step of obtaining the external conditions includes the steps of carrying out vehicle dynamic simulation on the test vehicle, and obtaining external conditions generated on the tire mounted on a particular wheel as a result thereof while associating with the acceleration.

According to the method as described above, since a test vehicle to be evaluated does not have to be prepared, the tire wear test can be carried out relatively easily, and thus an advantage can be obtained in an aspect of the cost. Also, in the present invention, external conditions are obtained being associated with the acceleration in each of lateral direction and longitudinal direction. These data can be handled without being particularly associated with each other. Therefore, the handling of data is extremely simplified, and thus running modes can be set up simply. That is, even when, for example, braking cornering is carried out during running test with an actual vehicle, since the acceleration in lateral direction and the acceleration in longitudinal direction are handled separately, it is not necessary to carry out the vehicle dynamics simulation during braking turn. As a result, the simulation is simplified and the number of steps is reduced.

In the case that there are a plurality of test vehicles to be evaluated, when the frequency distribution of acceleration is previously obtained during running on the test course, running modes can be set up easily by carrying out vehicle dynamics simulation on the test vehicles to obtain external conditions by commonly using the frequency distribution of acceleration.

BRIEF DESCRIPTION OF REFERENCE NUMERALS

1: Rotation drum
2: Endless belt
3: Test tire

BEST MODE FOR CARRYING OUT THE INVENTION

Figure 1:
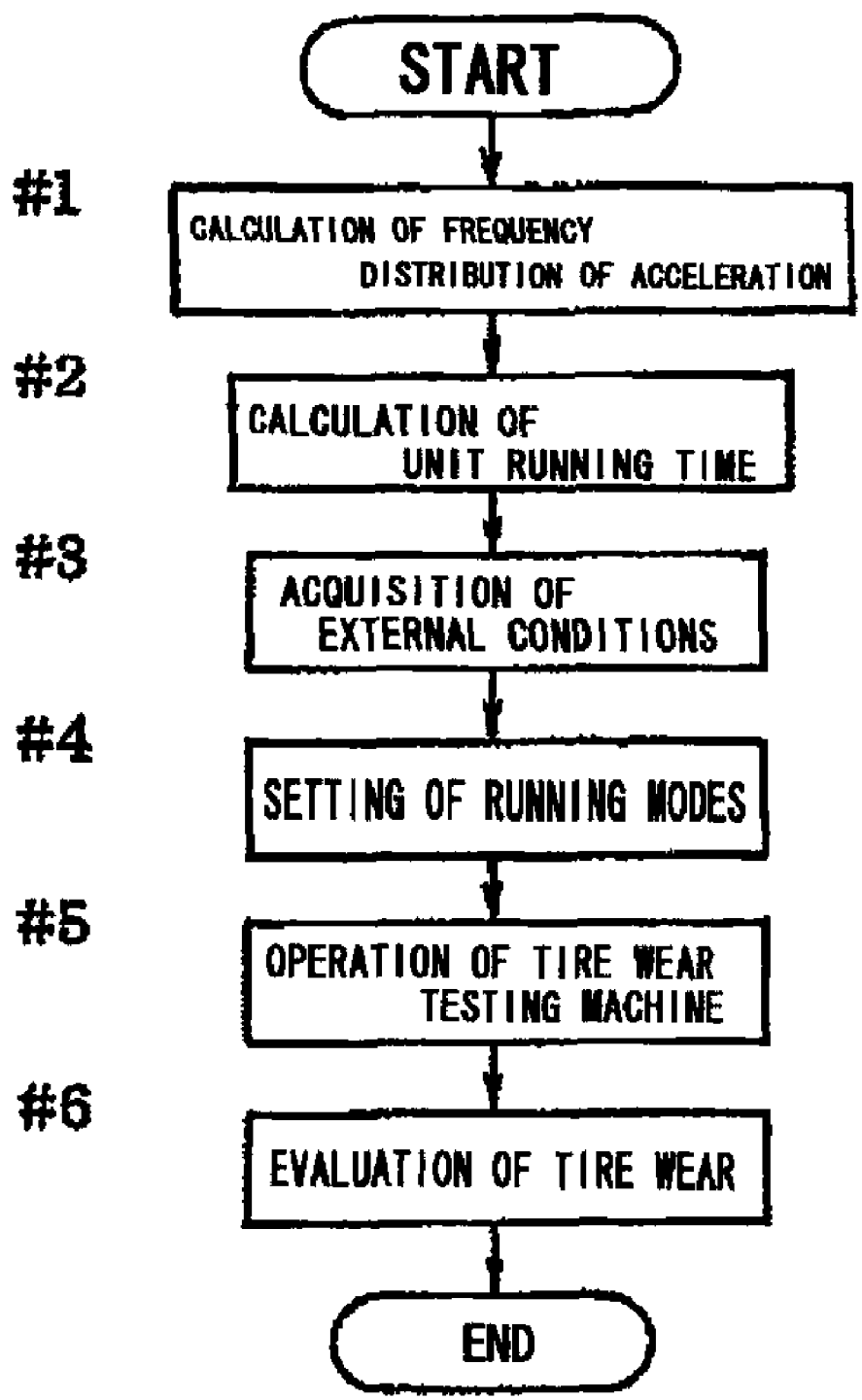
FIG. 1 is a flowchart showing an example of a procedure in a tire wear test of the present invention.

An embodiment of the present invention will be explained with reference to the drawings. FIG. 1 is a flowchart schematically showing a test procedure according to the embodiment. The embodiment carries out in the following order: calculation of distribution of acceleration frequency (#1), calculation of unit running time (#2), acquisition of external conditions (#3), setting of running modes (#4), operation of tire wear testing machine (#5), and evaluation of tire wear (#6). Descriptions will be made below in this order.

[Calculation of Distribution of Acceleration Frequency]

In this embodiment, an actual vehicle is driven on a test course to measure the acceleration, and distribution of frequency is calculated. An appropriate test course is selected from outdoor test courses or public roads on which running test with an actual vehicle should be simulated. The vehicle used for the running test with the actual vehicle is mounted with measuring equipment including an acceleration sensor at a point where the center of gravity is located. For example, acceleration of the vehicle in lateral direction and longitudinal direction thereof is measured every 0.1 seconds at increments of approximately 0.01 m/s$^2$ (0.001 G) in a manner of sampling (measurement frequency: 10 Hz).

The vehicle category used for the running test with the actual vehicle is not particularly limited. One category may be selected as a prototype from sedan, small car, mini-van, SUV, mini-sized vehicle and the like. Or, a plurality of categories may be selected and average value of measured results may be employed. Or, an average value of measured results obtained from all vehicle categories may be employed as a representative value in the test course. Unless a test vehicle runs in a peculiar manner, the difference in vehicle category gives only a small influence to the measurement results. However, if the vehicle category is largely different from the test vehicle to be evaluated, a large difference may be rendered to the measurement results. Therefore, a close or identical vehicle category should be preferably selected.

In the running test with the actual vehicle, steady-state straight running, turn running, driving running, braking running and the like are carried out under various conditions of the test course. And under various running conditions, the acceleration in the lateral direction and longitudinal direction is measured. Measured data are aggregated and frequency distribution of the acceleration is calculated.

Figure 2:
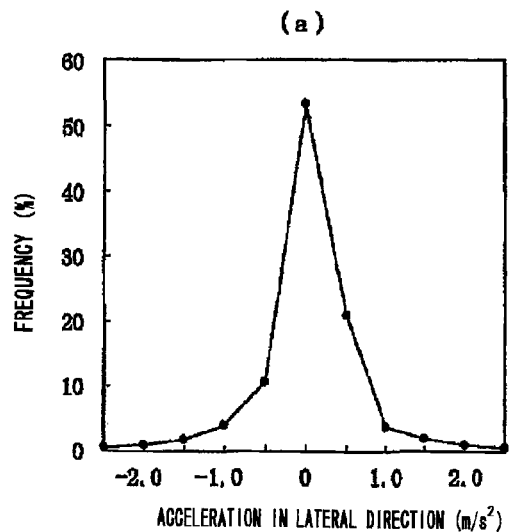
FIG. 2 is a graph showing an example of distribution of acceleration frequency.
Figure 2:
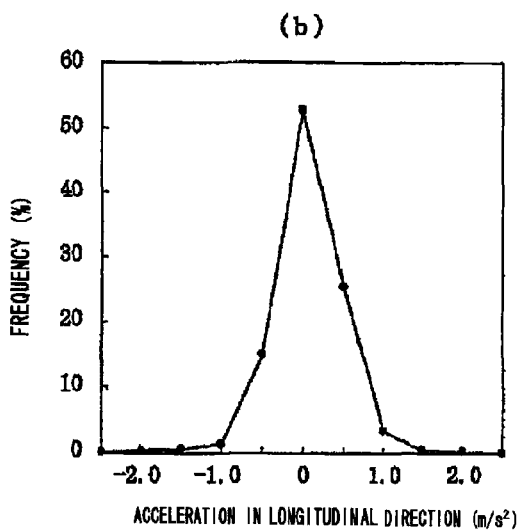

FIG. 2(a) is a graph showing an example of frequency distribution of acceleration in lateral direction; and FIG. 2(b) is a graph showing an example of frequency distribution of acceleration in longitudinal direction. In FIG. 2(a), positive values on the abscissa represent the acceleration at clockwise turning, and negative values on the abscissa represent the acceleration at anticlockwise turning. In FIG. 2(b), positive values on the abscissa represent the acceleration at driving, and negative values on the abscissa represent the acceleration at braking. The ordinate of the graph represents the ratio of frequency with respect to the total number of measurements of the acceleration in lateral direction or longitudinal direction defined as 1 (100%). In this embodiment, although the acceleration in both of lateral direction and longitudinal direction resides within a range of ±2.5 m/s$^2$, there may be a case where values may exceed the range depending on the conditions of the test course.

In order to set up the running modes in a simple manner by simplifying the handling of data, in the embodiment, the acceleration is sectionalized into predetermined level sections. Acceleration included in a level section is represented by a sectional median, and frequency distribution of each sectional median is calculated. Particularly, level sections are set to a level range of 0.5 m/s$^2$ acceleration included in a range from −0.25 m/s$^2$ or more to less than 0.25 m/s$^2$ is represented by 0 m/s$^2$ as its sectional median. Likewise, acceleration included in a range from 0.25 m/s$^2$ or more to less than 0.75 m/s$^2$ is represented by 0.5 m/s$^2$ as its sectional median. Likewise, acceleration included in the other ranges is also sectionalized, and frequency of each sectional median is calculated. Hereinafter, since the term "acceleration" occasionally means the sectional median, the term will be expressed as "acceleration (median)", in case of necessity.

[Calculation of Unit Running Time]

Unit running time is allotted based on the frequency of acceleration (median) obtained by the above step. Running time in one cycle of a running mode may be appropriately defined. For example, when one cycle is defined as one hour, the one-hour is allotted to each of acceleration (median) based on the frequency.

In the embodiment, the frequency distribution of acceleration (median) in lateral direction and the frequency distribution of acceleration (median) in longitudinal direction are obtained respectively, and the unit running time is also allotted to the respective frequency distribution of acceleration (median). Here, it is arranged so that one hour as one cycle is allotted based on the ratio of the frequency with respect to the total number of measurements of acceleration in lateral direction and longitudinal direction. For example, when the frequency of acceleration (median) of 1.5 m/s$^2$ in longitudinal direction is 0.5%, the frequency with respect to the total number is 0.25%. Therefore, the acceleration (median) of 1.5 m/s$^2$ in longitudinal direction is allotted by 9 seconds as the unit running time.

As for the unit running time to be allotted to the acceleration (median) in lateral direction, when the acceleration (median) at clockwise turning and the acceleration (median) at anticlockwise turning have the same absolute value and the difference in the frequency is small, a unit running time suitable for the average values therebetween may be allotted.

[Acquisition of External Conditions]

Subsequently, with respect to the tire to be evaluated mounted onto a particular wheel of the test vehicle, external conditions generated under particular running conditions are obtained being associated with the acceleration in lateral direction and longitudinal direction. As for the external conditions, in order to simplify the setting of running modes and to ensure the accuracy of the evaluation, three forces on tire axle and camber angle are preferably selected. In addition to the above, other external conditions may be added.

Figure 3:
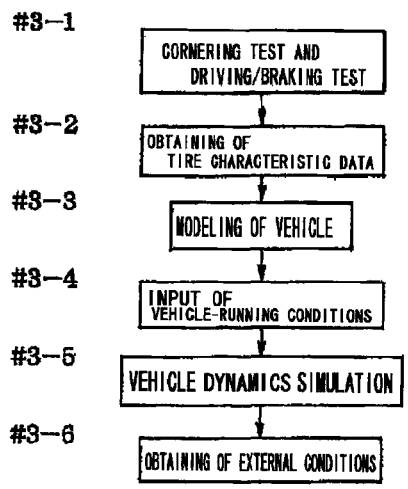
FIG. 3 is a flowchart showing an example of a subroutine of the flowchart in FIG. 1.

In this embodiment, in order to obtain external conditions generated on the tire mounted to a particular wheel (front-right wheel, front-left wheel, rear-right wheel or rear-left wheel), vehicle dynamic simulations are carried out on the test vehicle. The vehicle dynamics simulations may be carried out in accordance with a method disclosed in, for example, Japanese Patent Application Laid-Open No. 2002-356106. In the embodiment, the external conditions are acquired in accordance with a flowchart shown in FIG. 3 as described below.

First of all, using a tire to be evaluated, cornering test and driving/braking test are carried out (#3-1). These tests may be carried out using a known flat-belt cornering testing machine. The testing machine has a mechanism similar to that of a tire wear testing machine (refer to FIG. 7, which will be described later). Cornering performance test and driving and braking performance test are carried out by inputting loads such as three forces on tire axle, camber angle or the like to the tire rolling on a flat belt (endless belt).

Tire characteristic data are obtained through the above tests (#3-2). Various data are available as the tire characteristic data. Cornering data representing relationships of CF-SA, SAT-SA, CT-CA, and driving and braking data representing a relationship of Fx-S are the data necessary for the following vehicle dynamics simulation. Here, CF represents cornering force; SA represents slip angle; SAT represents self-aligning torque; CT represents camber thrust; CA represents camber angle; Fx represents longitudinal force; and S represents slip ratio. These tire characteristic data may be obtained by using a finite element method.

Subsequently, modeling of a vehicle is carried out (#3-3). As for modeling of the vehicle, only the mechanisms necessary for simulation may be selected. For example, the modeling is carried out on a suspension (mechanical characteristics such as dimensions, type, spring constant and the like), steering system and the like. Also, data such as distance between tire axles, weight of the vehicle, point of center of gravity and the like are inputted. With this modeling, analyses are carried out using a vehicle dynamics simulation software such as CarSim by Virtual Mechanics Corporation, ADAMS by Information Services International-Dentsu., Ltd. or the like, which are commercially available.

Subsequently, vehicle-running conditions are input (#3-4). Here, data with respect to particular running conditions (i.e., how the vehicle should be driven) such as steady-state straight running, turn running, driving running, braking running and the like are input. The running conditions include running speed, driving conditions, braking conditions, steering angle, turning radius and the like.

After completing the above modeling and inputting of necessary data, vehicle dynamics simulation is carried out (#3-5). The vehicle dynamics simulation is carried out in a state that the modelized tire is mounted on a vehicle. As a tire model, a magic formula tire model, which is obtained by inputting the data of tire characteristics acquired in the above-described steps, is used. In the vehicle dynamics simulation, movement of an automobile can be analyzed with a computer based on, a vehicle dynamics model expressed mainly by simultaneous differential equations, or a multi-component aggregation model in which major automobile components are assumed as an aggregation of rigid or flexible elements. Analyses are carried out using, for example, the above-mentioned commercially available software by inputting the above-described data of tire characteristics and running conditions.

As a result, with respect to the tire to be evaluated mounted on a particular wheel, external conditions generated under particular running conditions such as steady-state straight running, turn running, driving running, braking running and the like; more particularly, three forces on tire axle and camber angle are obtained being associated with the acceleration in lateral direction or in longitudinal direction (#3-6).

FIG. 4(a) is a graph showing a relationship between the acceleration in lateral direction and three forces on tire axle of a tire mounted to front left wheel of a front drive vehicle; and FIG. 4(b) is a graph showing a relationship between the acceleration in lateral direction and camber angle, which are obtained by using a simulation of turn running. More particularly, three forces on tire axle and camber angle are obtained while changing the acceleration in lateral direction by adjusting the setting values of running speed and turning radius at turn running. Although only the graph of clockwise turning is shown in the figure, anticlockwise turning is also calculated in the same manner. If necessary, external conditions with respect to the acceleration exceeding 3.0 m/s$^2$ are also calculated.

FIG. 5(a) is a graph showing a relationship between the acceleration in longitudinal direction and three forces on tire axle of a tire mounted to a front left wheel of a front drive vehicle; and FIG. 5(b) is a graph showing a relationship between the acceleration in longitudinal direction and camber angle, which are obtained by using a simulation of driving running. More particularly, three forces on tire axle and camber angle are obtained while changing the acceleration in longitudinal direction by adjusting the setting values of running speed and driving condition at driving running. Although only the graph of the driving running is shown in the figure, the braking running is also calculated in the same manner. If necessary, external conditions with respect to the acceleration exceeding 2.0 m/s$^2$ are also calculated.

With the simulation of steady-state straight running, three forces on tire axle and camber angle generated on the tire can be obtained when the acceleration in lateral direction and longitudinal direction is 0 m/s$^2$.

External conditions corresponding to the acceleration (median) of a range from 0 m/s$^2$ to a maximum value measured on the test course are obtained. Even before the calculation of the frequency distribution of the acceleration, when the maximum value of the acceleration to be measured is foreseeable experientially for example, the external conditions may be previously obtained. In this point, the test procedure of the present invention is not limited to the present embodiment.

[Setting of Running Mode]

Running modes are set up so that the external conditions obtained by the above-described steps are input to the tire in accordance with the frequency of the acceleration (median) corresponding to the external conditions; in this embodiment, corresponding to the unit running time allotted to each acceleration (median).

Figure 5:
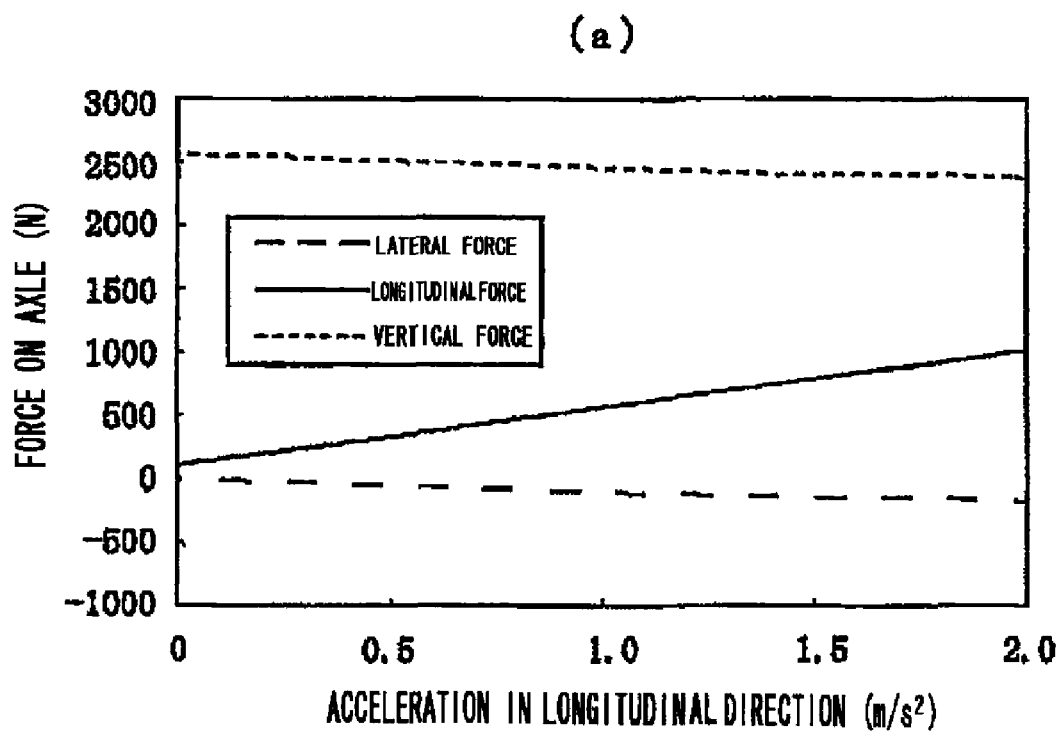
FIG. 5(a) is a graph showing a relationship between the acceleration in a longitudinal direction and three forces on tire axle.
FIG. 5(b) is a graph showing a relationship between the acceleration in a longitudinal direction and camber angle, which are obtained as a result of vehicle dynamics simulation.
Figure 5:
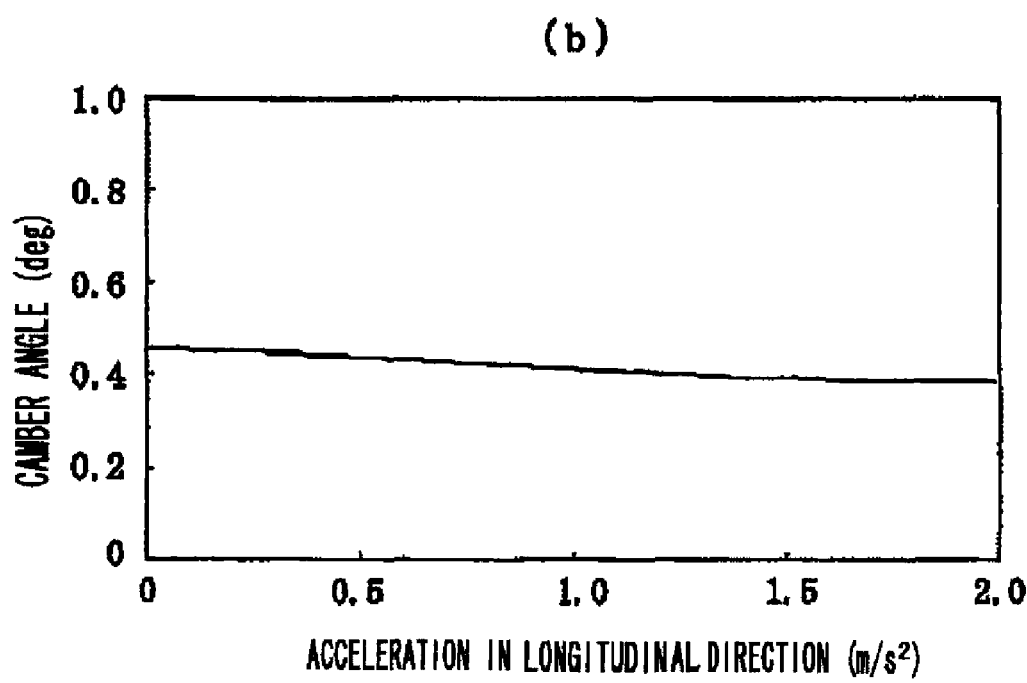

For example, in the case where the frequency distribution of acceleration (median) in longitudinal direction obtained in FIG. 2(b) and external conditions obtained in FIG. 5 are used, assuming that one cycle of the running mode is one hour, the acceleration (median) of 1.5 m/s$^2$ in longitudinal direction is allotted with a unit running time of 9 seconds as described above. Therefore, the running mode is set up so that the external conditions (lateral force: −143 N, longitudinal force: 797 N, vertical force: 2403 N and camber angle: 0.39°) corresponding to the acceleration 1.5 m/s$^2$ in FIG. 5 is input with 9 seconds. With respect to the acceleration (median) of −1.5 m/s$^2$ in longitudinal direction, the acceleration (median) of 1.5 m/s$^2$ and −1.5 m/s$^2$ in lateral direction also, the running modes are set up in the same manner. Further, with respect to the acceleration (median) other than 1.5 m/s$^2$, in this embodiment, with respect to each acceleration (median) of 0, 0.5, 1.0, 2.0 and 2.5 m/s$^2$, the running modes are also set up in the same manner.

Figure 6:
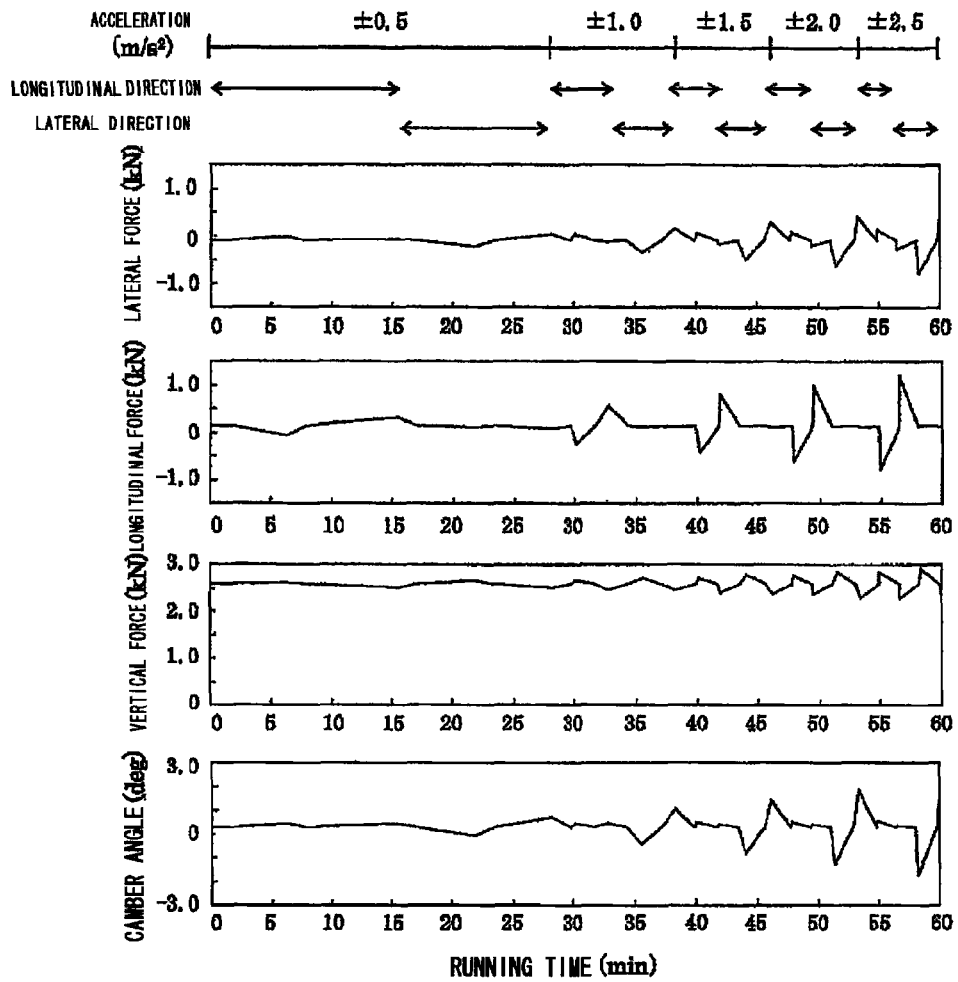
FIG. 6 is a graph showing an example of running modes.

FIG. 6 shows graphs demonstrating the set up running modes. In the graphs, the ordinate indicates external conditions (lateral force, longitudinal force, vertical force and camber angle in this order from the top) to be input to the tire; and the abscissa indicates the running time of one cycle obtained by accumulating the unit running times of the respective modes. Above the graphs, values of acceleration (median) corresponding to the external conditions are shown; and arrowheads therebelow indicate lateral direction and longitudinal direction and duration thereof. Although the acceleration (median) of 0 m/s$^2$ is not indicated, the external conditions corresponding to 0 m/s$^2$ are set up to be input between the respective modes.

In this embodiment, data are set up so that external conditions corresponding to the acceleration (median) −0.5 m/s$^2$ in longitudinal direction and external conditions corresponding to 0.5 m/s$^2$ are input in order first; and subsequently external conditions corresponding to the acceleration (median) 0.5 m/s$^2$ in lateral direction and external conditions corresponding to −0.5 m/s$^2$ are input in order. That is, data are set up so that external conditions corresponding to the acceleration (median) in each of lateral direction and longitudinal direction are input to the tire respectively. With this arrangement, the handling of data is simplified and the running modes can be set up simply.

In this embodiment, after external conditions corresponding to acceleration (median) 0.5 m/s$^2$ are input, likewise external conditions corresponding to 1.0, 1.5, 2.0 and 2.5 m/s$^2$ are subsequently input to the tire in order as a batch for each acceleration (median), and one cycle is terminated. However, the present invention is not limited to the above. For example, data may be set up so that external conditions corresponding to each acceleration (median) at clockwise turning are input to the tire in order first, and subsequently, external conditions corresponding to each acceleration (median) at anticlockwise turning, at driving running and at braking running are input in order as a batch for running conditions, and then one cycle may be terminated.

As for rotation speed of the tire (running speed), course average speed, which is calculated using mileage of the test course and running time, may be uniformly employed for the respective modes. However, it is preferred to employ average speed for each of the acceleration (median). With this arrangement, the severity can be reproduced more precisely. The average speed during each of the acceleration (median) can be calculated by providing a GPS function to measuring equipment mounted on the vehicle that runs on the test course, and by measuring the running point at a point of unit measuring time of the acceleration.

When there are a plurality test courses to be evaluated, the vehicle dynamics simulation is carried out first to obtain external conditions generated on the tire mounted on a particular wheel of the test vehicle. Therefore, by calculating only the frequency distribution of acceleration in the respective test courses, the running modes for the test courses can be set up simply by commonly using the external conditions obtained by the simulation.

According to the present invention, compared to the case where running modes at running test with an actual vehicle are reproduced time-sequentially, the running modes can be set up simply in a relatively short time. Therefore, it is not necessary to carry out the acceleration test to reduce the testing time as the conventional manner. Therefore, in this embodiment, the severity is not particularly increased by increasing the acceleration ratio. With this arrangement, the severity at the running test with the actual vehicle can be reproduced precisely and the evaluation accuracy is ensured.

[Operation of Tire Wear Testing Machine]

Figure 7:
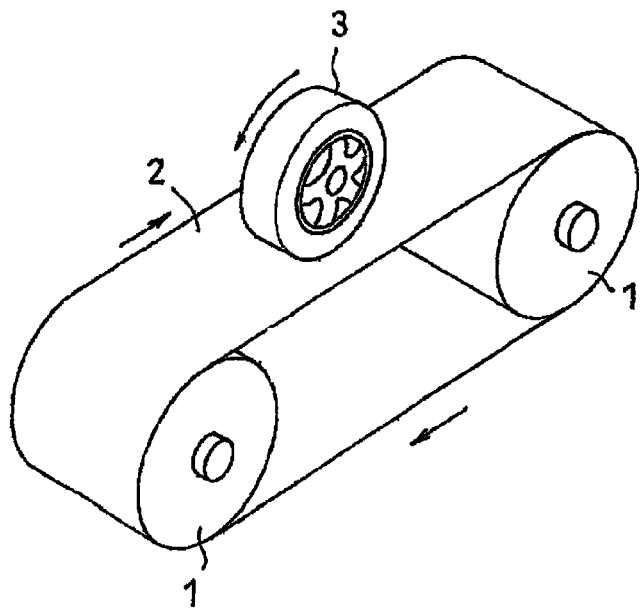
FIG. 7 is a schematic view showing the configuration of a tire wear testing machine.

FIG. 7 is a schematic view of a tire wear testing machine schematically showing the configuration thereof. The tire wear testing machine is a flat belt type wear testing machine that includes an endless belt 2 laid around between a pair of rotation drums 1 to form a simulation road surface, and a tire supporting device (not shown) that rotatably supports a test tire 3 on the endless belt 2. The tire wear testing machine enables indoor tire wear test simulating the running test with an actual vehicle.

The tire-supporting device has a driving mechanism for driving to rotate the test tire 3, and simulates steady-state straight running synchronously with the rotation of the drum 1. Further, by causing the rotation speed between the test tire 3 and the endless belt 2 be different from each other, a longitudinal force is input to the test tire 3 simulating the driving running or backing running. Furthermore, a vertical force can be input to the test tire 3 by swinging the same in a vertical direction; or a camber angle can be input to the test tire 3 by inclining the same with respect to the vertical direction. Furthermore, by swinging the endless belt 3, a slip angle is given to the test tire 3 thereby a lateral force can be input to the tire.

As the above described tire wear testing machines, various mechanisms are known and exemplified by mechanisms disclosed in Japanese Patent application Laid-Open No. 11-173952, Japanese Patent application Laid-Open No. 2005-114605 and the like.

A computer controls operations necessary for tire wear test such as rotation drive, swinging and inclination of the test tire 3 as well as rotation drive and swinging of the rotation drum 1. The operations are carried out based on the set up running modes. That is, three forces on tire axle and camber angle are input to the test tire 3 in accordance with the corresponding frequency of acceleration (median) based on the set up running modes. With this arrangement, the severity is reproduced precisely on the simulation road surface and the tire wear test can be carried out appropriately simulating the running test with the actual vehicle.

[Evaluation of Tire Wear]

After rolling the test tire 3 on the simulation road surface based on the running modes using the tire wear testing machine, evaluation of the tire wear is carried out. Ordinarily, since the test is carried out indoor under controlled conditions, the conditions of the road surface do not change due to the influence of the weather or the like. Therefore, a plurality of test tires can be evaluated under identical conditions.

EXAMPLES

An example that concretely demonstrates the configuration and effect of the present invention will be described below.

An ordinary radial tire of a tire size 145/80R13 was used as an object to be evaluated by the test. The tire was mounted onto a front-left wheel of a front drive vehicle made in Japan and running test was carried out with an actual vehicle on a test course. The frequency distribution of the acceleration (median) in each of lateral direction and longitudinal direction shown in FIG. 2 was obtained. It was arranged so that one-hour in one cycle of running mode is allotted in accordance with the frequency with respect to the total number of acceleration measurements in lateral direction and longitudinal direction; and thus unit running time for each acceleration (median) was calculated.

Figure 4:
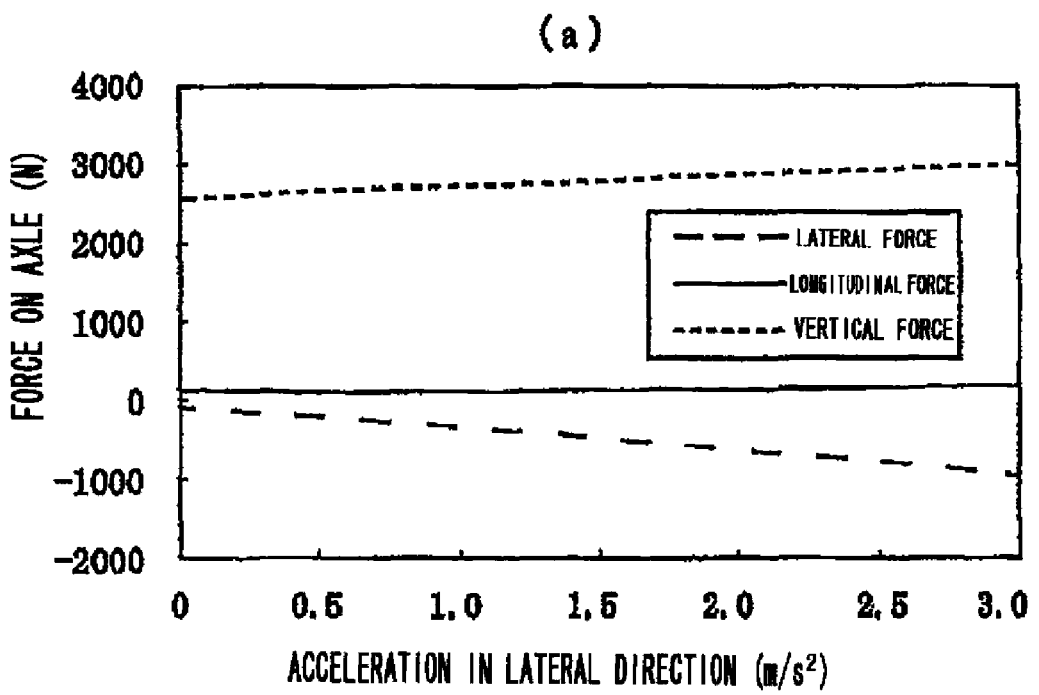
FIG. 4(a) is a graph showing a relationship between the acceleration in lateral direction and three forces on tire axle.
FIG. 4(b) is a graph showing a relationship between the acceleration in lateral direction and camber angle, which are obtained as a result of vehicle dynamics simulation.
Figure 4:
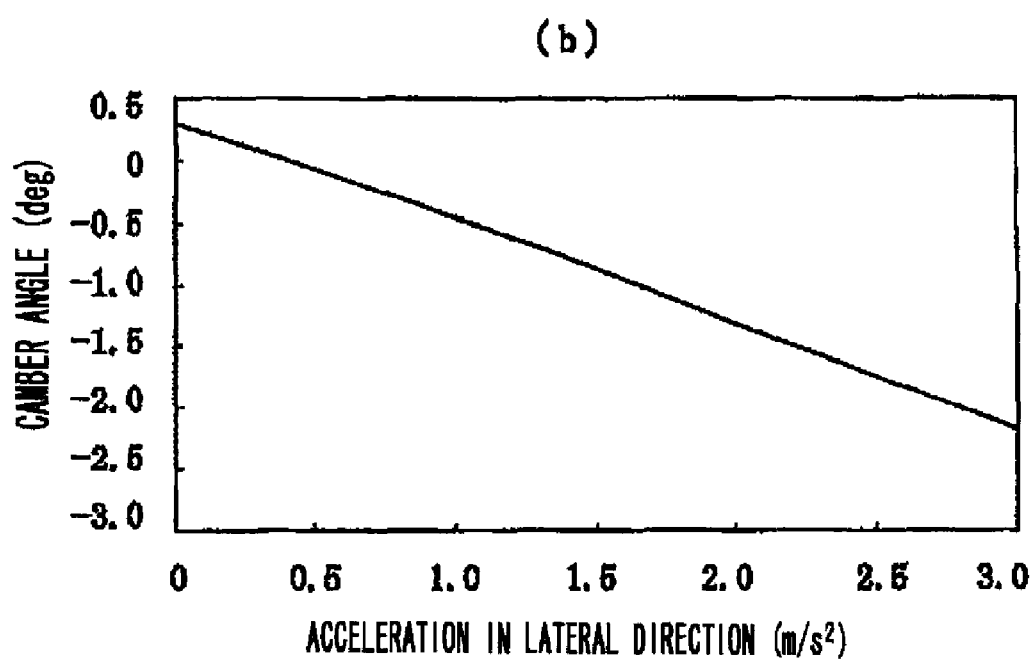

Further, cornering test and driving/braking test were carried out on the radial tire to obtain data of tire characteristics. Then, using the above-mentioned software, which is commercially available, vehicle dynamics simulations were carried out with respect to the running conditions including steady-state straight running, turn running, driving running and braking running. As a result of the vehicle dynamics simulations, three forces on tire axle and camber angle generated on the tire mounted on a front-left wheel of the vehicle were calculated as shown in FIG. 4 and FIG. 5. Although not shown in FIG. 4 and FIG. 5, the relationship between the acceleration of negative values and external conditions were also calculated.

Subsequently, running modes shown in FIG. 6 were set up so that three forces on tire axle and camber angle were input to the tire in accordance with the unit running time allotted to the corresponding acceleration (median) Then, the setting data of the running modes were input to the tire wear testing machine, and the test tire was rolled on the endless belt based on the running modes to test the tire wear. In order to make the conditions of the endless belt closer to those of an asphalt road surface, sandpaper was attacked to the surface of the endless belt, and the belt was processed to prevent the accumulation of rubber powder that is generated due to wear of the tire.

Figure 8:
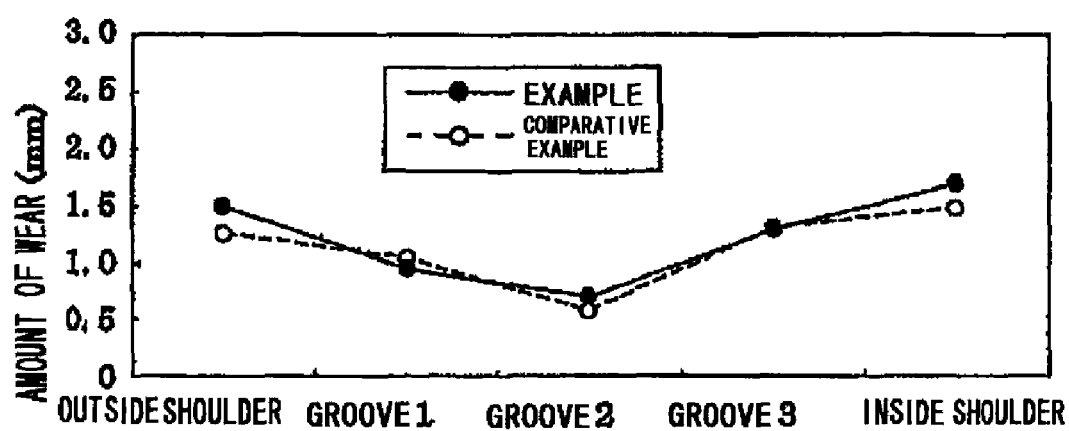
FIG. 8 shows an evaluation result of the wear of tire.

FIG. 8 shows evaluation results of tire wear. Comparative example represents wear test results obtained by carrying out running test with the actual vehicle. Both of the example and comparative example represent the results at a point of 7,000 km mileage. The amount of wear on the ordinate represents the values of grooves at five points; i.e., a groove in a peripheral direction passing through the center of the tire (groove 2); grooves extending in a peripheral direction at both sides of the tire (groove 1 and groove 3); and lateral groove extending on the shoulder sections at both side of the tire. The amount of wear was measured with a depth gauge. As shown in FIG. 8, both of the example and comparative example show a tendency of shoulder wear and the amount of wear thereof are roughly equal to each other. Accordingly, it is demonstrated that the present invention reproduces the severity precisely on the simulation road surface, and evaluation accuracy of the tire wear is ensured.

The invention claimed is:

1. A method of tire wear test for testing tire wear by rolling a tire on a simulation road surface, comprising the steps of:
    obtaining frequency distribution of acceleration in each of the lateral direction and longitudinal direction during running on a test course;
    obtaining each of external conditions generated wider particular running conditions while associating with the acceleration in lateral direction or longitudinal direction with respect to a tire mounted on a particular wheel of a test vehicle; and
    rolling the tire on the simulation road surface based on running modes by setting the running modes so that the external conditions are input to the tire in accordance with the frequency of the acceleration corresponding to the external conditions,
    wherein the step of obtaining the external conditions includes the steps of carrying out vehicle dynamic simulation on the test vehicle, and obtaining external conditions generated on the tire mounted on a particular wheel as a result thereof while associating with the acceleration.

2. The method of tire wear test according to claim 1, wherein the external conditions include three forces on tire axle and camber angle.

3. The method of tire wear test according to claim 1, wherein the running modes are set up so that each of the external conditions corresponding to the acceleration in lateral direction or longitudinal direction is input to the tire.

* * * * *